(12) United States Patent
Jones et al.

(10) Patent No.: US 11,741,668 B2
(45) Date of Patent: Aug. 29, 2023

(54) TEMPLATE BASED GENERATION OF 3D OBJECT MESHES FROM 2D IMAGES

(71) Applicant: Roblox Corporation, San Mateo, CA (US)

(72) Inventors: Ramsey Jones, Seattle, WA (US); Jared Lafer, Los Angeles, CA (US); Rebecca Kantar, Truro, MA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 17/239,380

(22) Filed: Apr. 23, 2021

(65) Prior Publication Data

US 2021/0335039 A1    Oct. 28, 2021

Related U.S. Application Data

(60) Provisional application No. 63/015,391, filed on Apr. 24, 2020.

(51) Int. Cl.
*G06T 17/20* (2006.01)
*G06T 13/20* (2011.01)
*G06N 20/00* (2019.01)

(52) U.S. Cl.
CPC ............ *G06T 17/20* (2013.01); *G06N 20/00* (2019.01); *G06T 13/20* (2013.01)

(58) Field of Classification Search
CPC ......... G06T 17/20; G06T 13/20; G06T 15/04; G06N 20/00; G06N 3/0454; G06N 3/045
See application file for complete search history.

(56) References Cited

U.S. PATENT DOCUMENTS

| 10,909,746 | B1 * | 2/2021 | Kantar ...................... G06T 7/35 |
| 2005/0105804 | A1 * | 5/2005 | Francos ............. G06V 10/7515 |
| | | | 382/215 |
| 2010/0040285 | A1 * | 2/2010 | Csurka ................. G06V 10/464 |
| | | | 382/170 |

(Continued)

FOREIGN PATENT DOCUMENTS

| WO | 2020/075098 | 4/2020 |
| WO | WO-2020075098 A1 * | 4/2020 ........... A63F 13/213 |

OTHER PUBLICATIONS

WIPO, Written Opinion for International Patent Application No. PCT/US2021/028973, dated Jul. 20, 2021, 13 pages.

(Continued)

*Primary Examiner* — Michael Le
(74) *Attorney, Agent, or Firm* — IP Spring

(57) ABSTRACT

Some implementations relate to methods, systems, and computer-readable media to generate text tags for games. In some implementations, a computer-implemented method to generate a 3D mesh for an object using a trained machine learning model includes providing a two-dimensional (2D) image of the object as input to the trained machine learning model, obtaining a template three-dimensional (3D) mesh, and generating, using the trained machine learning model and based on the 2D image and the template 3D mesh, a 3D mesh for the object, wherein the 3D mesh for the object is obtained by deforming the template 3D mesh and is usable to map a texture or to generate a 3D animation of the object.

17 Claims, 12 Drawing Sheets

(56) References Cited

U.S. PATENT DOCUMENTS

| | | | |
|---|---|---|---|
| 2014/0037198 A1* | 2/2014 | Larlus-Larrondo | G06T 7/11 382/173 |
| 2015/0325044 A1* | 11/2015 | Lebovitz | G06T 15/04 345/420 |
| 2016/0027200 A1* | 1/2016 | Corazza | G06T 15/04 345/420 |
| 2018/0293788 A1* | 10/2018 | Black | G06Q 30/0601 |
| 2019/0035149 A1* | 1/2019 | Chen | G06T 17/20 |
| 2019/0122411 A1* | 4/2019 | Sachs | G06T 7/90 |
| 2019/0147221 A1* | 5/2019 | Grabner | G06T 19/006 382/103 |

OTHER PUBLICATIONS

WIPO, International Search Report for International Patent Application No. PCT/US2021/028973, dated Jul. 20, 2021, 2 pages.

* cited by examiner

TEMPLATE BASED GENERATION OF 3D OBJECT MESHES FROM 2D IMAGES

CROSS-REFERENCE TO RELATED PATENT APPLICATIONS

The present application is a non-provisional of and claims the benefit of priority to U.S. Provisional Application Ser. No. 63/015,391, entitled "UNIFYING FRAMEWORK FOR MESH RECONSTRUCTION AND TEXTURING," filed on Apr. 24, 2020, the entire contents of which are hereby incorporated by reference herein.

TECHNICAL FIELD

Implementations relate generally to computer-based assessments and computer-based gaming, and more particularly, to methods, systems, and computer readable media to generate three-dimensional (3D) object meshes from corresponding two-dimensional (2D) images within a virtual environment.

BACKGROUND

Traditional standardized cognitive assessments primarily evaluate content mastery or domain knowledge, processing speed, and memory. The College Entrance Examination Board, now the College Board, was established in 1923 to define a set of college admission standards through the dissemination of the Scholastic Aptitude Test (SAT). In 1959, the American College Test (ACT) was released as an alternative to the SAT. Both the ACT and the SAT focus on standardized content in mathematics, writing, science, and other subject-specific areas to create objective metrics. While widely adopted across the United States, these assessments reveal little about an individual's specific cognitive abilities or predicted college performance.

In response to the shortcomings in both the methodology and substance of traditional standardized college admissions tests, employers have adopted other traditional cognitive ability or intelligence tests in an effort to glean more predictive insights on applicants' cognitive profiles. These assessments focus on content mastery or domain knowledge, processing speed, memory, as well as capabilities required by the 21st-century workforce. The assessments can include displays of visual representation of real-life objects such as vehicles, planes as well as biological assets that set a baseline scenario for the assessee.

Some online platforms (e.g., gaming platforms, media exchange platforms, etc.), allow users to connect with each other, interact with each other (e.g., within a game), create games, and share information with each other via the Internet. Users of online gaming platforms may participate in multiplayer gaming environments or virtual environments (e.g., three-dimensional environments), design custom gaming environments, design characters, design mechanisms, exchange virtual items/objects with other users, communicate with other users using audio or text messaging, and so forth. Users may interact with objects within the virtual environment, and simulation of the objects may be performed within the virtual environment. Simulation of objects within the virtual environment may utilize representations of a variety of objects, which may then be displayed on one or more user device(s). Some implementations were conceived in light of the above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to generate a 3D mesh for an object using a trained machine learning model. The computer-implemented method also includes providing a two-dimensional (2D) image of the object as input to the trained machine learning model; obtaining a template three-dimensional (3D) mesh; and generating, using the trained machine learning model and based on the 2D image and the template 3D mesh, a 3D mesh for the object, where the 3D mesh for the object is usable to map a texture or to generate a 3D animation of the object. Other embodiments of this aspect include corresponding computer systems, apparatus, and computer programs recorded on one or more computer storage devices, each configured to perform the actions of the methods.

Implementations may include one or more of the following features. The computer-implemented method may include displaying a user interface that includes the 3D mesh for the object. The 3D mesh for the object is obtained by deforming the template 3D mesh by the trained machine learning model. The computer-implemented method may include, prior to obtaining the template 3D mesh, determining a category of the object based on the 2D image using image matching. The computer-implemented method may include mapping the texture to the 3D mesh. The template 3D mesh is a rig may include a plurality of vertices of the 3D mesh, and where each vertex of the plurality of vertices is connected to at least one other vertex of the plurality of vertices, and may include: obtaining one or more template animations associated with the template 3D mesh, where each template animation defines movement of two or more of the plurality of vertices; and generating at least one object animation for the object based on the 3D mesh and particular template animation of the one or more template animations associated with the template 3D mesh, where the at least one object animation includes movement of the same two or more vertices as the particular template animation of the one or more template animations. The machine learning model includes a mesh encoder, an image encoder, and a plurality of mesh decoders, and may include: receiving a plurality of target meshes; and training the plurality of mesh decoders, where each mesh decoder corresponds to a particular template mesh, where the training may include: encoding, using the mesh encoder, a target mesh into a shape space vector; decoding, using the mesh decoder and based on the particular template mesh, the shape space vector into a deformed mesh; determining a first value for a first error function based on a comparison of the target mesh and the deformed mesh; and updating one or more parameters of the mesh decoder based on the first value. The machine learning model includes a mesh encoder, an image encoder, and a plurality of mesh decoders, and may include training the image encoder, where the training may include: receiving a plurality of two-dimensional (2D) training images and corresponding target meshes, where each image depicts a particular object of a respective category and where the category is associated with a corresponding template mesh; generating, using the image encoder, a respective shape space vector for each of the plurality of 2D training images; comparing each generated shape space vector with a corresponding shape space vector for the corresponding target mesh where the corresponding shape space vector associated with the target mesh is encoded using the mesh encoder; determining a second value for a second error function based on a comparison of the generated shape space vector and the corresponding shape space vector; and updating one or more parameters of the image encoder based on the second value. The mapping is used to apply the texture to the 3D mesh of the object. The uv regressor is trained using a loss function that includes a descriptor loss based on a chamfer distance. The template 3D mesh is a homeomorphic template mesh. Implementations of the described techniques may include hardware, a method or process, or computer software on a computer-accessible medium.

One general aspect includes a system. The system also includes a memory with instructions stored thereon; and a processing device, coupled to the memory, the processing device configured to access the memory, where the instructions when executed by the processing device, cause the processing device to perform operations including: providing a two-dimensional (2D) image of an object as input to a trained machine learning model; obtaining a template three-dimensional (3D) mesh; and generating, using the trained machine learning model and based on the 2D image and the template 3D mesh, a 3D mesh for the object, where the 3D mesh for the object is usable to map a texture or to generate a 3D animation of the object. Other embodiments of this aspect include corresponding computer systems, apparatus, and computer programs recorded on one or more computer storage devices, each configured to perform the actions of the methods.

Implementations may include one or more of the following features. The system where the 3D mesh for the object is obtained by deforming the template 3D mesh by the trained machine learning model. The template 3D mesh is a rig may include a plurality of vertices of the 3D mesh, and where each vertex of the plurality of vertices is connected to at least one other vertex of the plurality of vertices, and where the operations further may include: obtaining one or more template animations associated with the template 3D mesh, where each template animation defines movement of two or more of the plurality of vertices; and generating at least one object animation for the object based on the 3D mesh and particular template animation of the one or more template animations associated with the template 3D mesh, where the at least one object animation includes movement of the same two or more vertices as the particular template animation of the one or more template animations. The template 3D mesh is a homeomorphic template mesh. The machine learning model includes a mesh encoder, an image encoder, and a plurality of mesh decoders, and where the operations further may include: receiving a plurality of target meshes; training the plurality of mesh decoders, where each mesh decoder corresponds to a particular template mesh, where the training may include: encoding, using the mesh encoder, a target mesh into a first shape space vector; decoding, using the mesh decoder and based on the particular template mesh, the first shape space vector into a deformed mesh; determining a first value for a first error function based on a comparison of the target mesh and the deformed mesh; and updating one or more parameters of the mesh decoder based on the first value; and training the image encoder, where the training may include: receiving a plurality of two-dimensional (2D) training images and corresponding target meshes, where each image depicts a particular object of a respective category and where the category is associated with a corresponding template mesh; generating, using the image encoder, a respective shape space vector for each of the plurality of 2D training images; comparing each generated shape space vector with a corresponding shape space vector for the corresponding target mesh, where the corresponding shape space vector associated with the target mesh is encoded using the mesh encoder; determining a second value for a second error function based on a comparison of the generated shape space vector and the corresponding shape space vector; and updating one or more parameters of the image encoder based on the second value. Implementations of the described techniques may include hardware, a method or process, or computer software on a computer-accessible medium.

One general aspect includes a non-transitory computer-readable medium may include instructions that. The non-transitory computer-readable medium also includes providing a two-dimensional (2D) image of the object as input to the trained machine learning model; obtaining a template three-dimensional (3D) mesh; and generating, using the trained machine learning model and based on the 2D image and the template 3D mesh, a 3D mesh for the object, where the 3D mesh for the object is usable to map a texture or to generate a 3D animation of the object. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the template 3D mesh is a homeomorphic template mesh. The template 3D mesh is a rig may include a plurality of vertices of the 3D mesh, and where each vertex of the plurality of vertices is connected to at least one other vertex of the plurality of vertices, and the operations further may include: obtaining one or more template animations associated with the template 3D mesh, where each template animation defines movement of two or more of the plurality of vertices; and generating at least one object animation for the object based on the 3D mesh and particular template animation of the one or more template animations associated with the template 3D mesh, where the at least one object animation includes movement of the same two or more vertices as the particular template animation of the one or more template animations. The operations further may include: processing, using a uv regressor, the 2D image and the 3D mesh of the object to generate a mapping from vertices of the 3D mesh of the object to the 2D image, where the mapping is used to apply the texture to the 3D mesh of the object. Implementations of the described techniques may include hardware, a method or process, or computer software on a computer-accessible medium.

One general aspect includes a method to train a machine learning model that includes a mesh encoder. The method also includes receiving a plurality of target meshes. The method also includes training the plurality of mesh decoders, where each mesh decoder corresponds to a particular template mesh, where the training may include: encoding, using the mesh encoder, a target mesh of the plurality of target meshes into a shape space vector; decoding, using the mesh decoder and based on a particular template mesh that corresponds to the mesh decoder, the shape space vector into a deformed mesh; determining a first value for a first error function based on a comparison of the target mesh and the deformed mesh; and updating one or more parameters of the mesh decoder based on the first value. Other embodiments of this aspect include corresponding computer systems, apparatus, and computer programs recorded on one or more computer storage devices, each configured to perform the actions of the methods.

Implementations may include one or more of the following features. The method where each of the plurality of mesh decoders is pre-trained to approximate the identity function on the corresponding template mesh. The first error function is a fitness function that is indicative of a distance of the deformed mesh to the target mesh. Implementations of the described techniques may include hardware, a method or process, or computer software on a computer-accessible medium.

One general aspect includes a method to train a machine learning model that includes a mesh encoder and an image encoder to generate a three-dimensional (3D) mesh from a two-dimensional (2D) image of an object. The method also includes receiving a plurality of two-dimensional (2D) training images and corresponding target meshes, where each image depicts a particular object of a respective category and where the category is associated with a corresponding template mesh; generating, using the image encoder, a respective shape space vector for each of the plurality of 2D training images; comparing each generated shape space vector with a corresponding shape space vector for the corresponding target mesh, where the corresponding shape space vector associated with the target mesh is encoded using the mesh encoder; determining a second value for a second error function based on a comparison of the generated shape space vector and the corresponding shape space vector; and updating one or more parameters of the image encoder based on the second value. Other embodiments of this aspect include corresponding computer systems, apparatus, and computer programs recorded on one or more computer storage devices, each configured to perform the actions of the methods.

Implementations may include one or more of the following features. The method where the second error function is a fitness function that is indicative of a distance of the generated shape space vector to the corresponding shape space vector. Implementations of the described techniques may include hardware, a method or process, or computer software on a computer-accessible medium.

DETAILED DESCRIPTION

Figure 1:
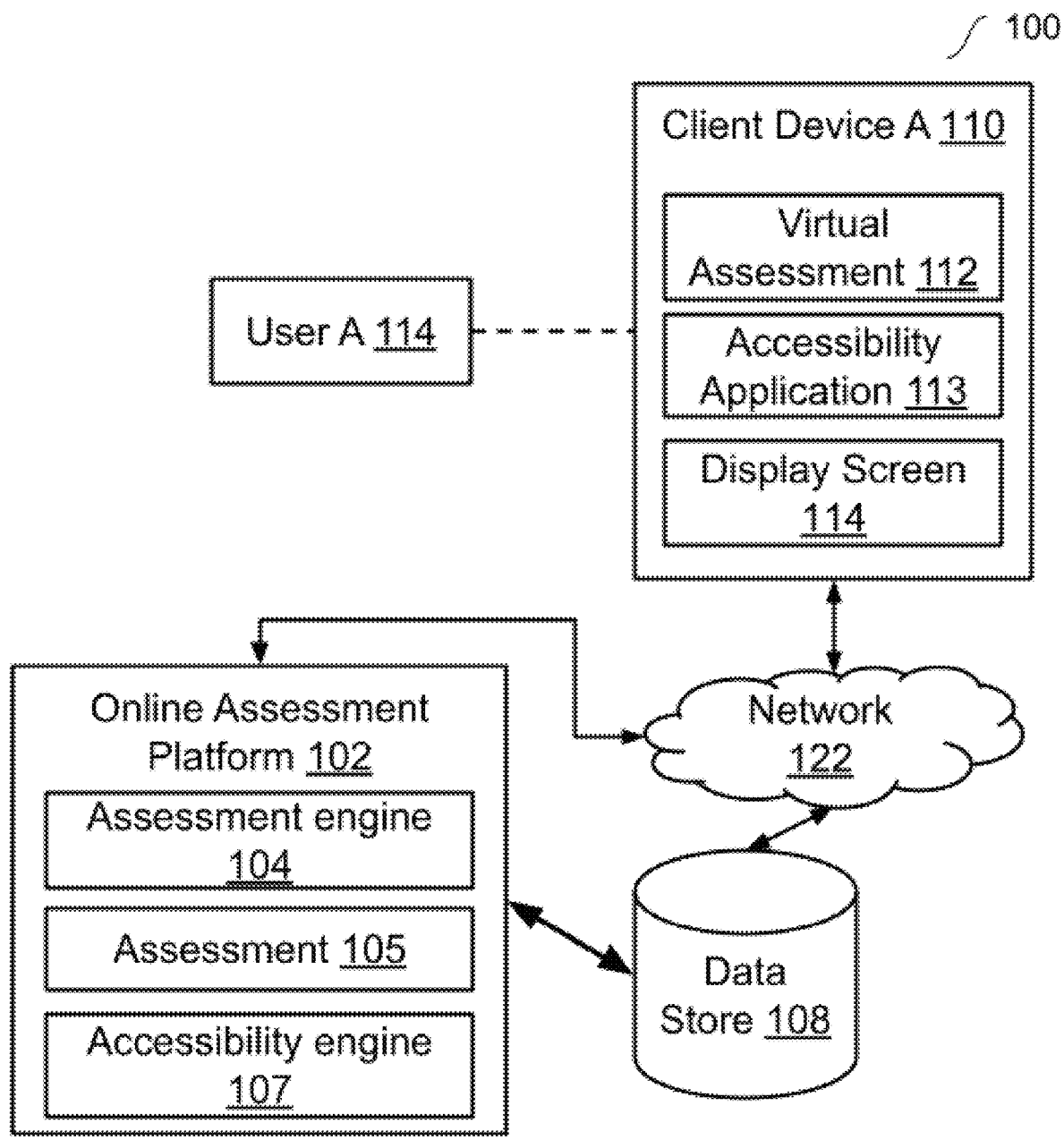
FIG. 1 is a diagram of an example network environment for computer-based assessment, in accordance with some implementations.

In the following detailed description, reference is made to the accompanying drawings, which form a part hereof In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided for a simulation-based assessment that focuses on evaluating how an individual thinks instead of what he or she knows. Scenarios or tasks may be embedded within the simulation-based assessment that abstract the context of a given environment, e.g., a work environment, while maintaining opportunities for a user to portray problem-solving capabilities required by the job. Through scenarios that take place in the simulation-based assessment, details of a user's cognitive processes, not just his or her end choices, may be observed. The simulation-based assessment may accordingly discount the high value placed on memory and processing speed in traditional cognitive assessments, such as the SAT and the ACT.

In some embodiments, because skills like "critical thinking" can happen in many contexts requiring different modes and degrees of intensity, simulation-based assessments may bring to life contexts that mirror realistic scenarios that are dynamic, real-time adaptive, and/or highly realistic. These scenarios may prompt complex chains of reasoning and robust mental models by offering test takers rich narratives. Creating realistic scenarios may require abstracting both daily work activities and contextual elements that comprise the real world conditions for which an assessment strives to predict future outcomes. To break daily activities down into components for constructing tasks, granular descriptors, termed "bones," may be used as atomic units behind task designs. Bones may include a verb, object, and adjective or adjective phrase.

In some embodiments, designing a scenario may require stringing together sequences of bones in combinations that are both theoretically sound, meaning their sequence offers insight into constructs of interest, and sensible given whatever abstracted context, termed "skin," in which the scenario takes place. The skin of a scenario may dictate possible scenario construction as well as potential setting-induced biases that could obfuscate test-takers' true skill level. In selecting a skin dexterous and complex enough may be selected to represent a wide range of contexts in which problem-solving skills required mimic those required in real-world scenarios. To ensure the culmination of bones and underlying constructs represent whole problem-solving spaces as they exist on the job, vignettes of real scenarios may be mapped to preliminary task designs. Contextual characteristics—details of situational constraints, objectives, time horizons, information availability—may be diagnosed to ensure the conditions under which test-takers are performing problem-solving skills are structurally aligned with real-world situations.

In some embodiments, the simulation-based assessment includes one or more scenarios embedded in an abstracted natural world environment. The natural world setting may limit bias and offer an accessible context for a global population, regardless of background and prior knowledge. Regardless of geography, field of study, gender, or ethnicity, all test-takers have some basic understanding of plants, animals, the weather, concepts that serve as useful components to designing complex scenarios. The assessment may require a user to interact with a series of challenges involving terrain, plants, and wildlife within the natural world setting. For example, in one scenario, a user may be required to identify impending environmental threats in an ecosystem given certain evidence.

In some embodiments, no element of the narrative being presented in a scenario may violate reality because doing so would penalize a test-taker's reasonable mental models for how the world works and in turn, would mistake confusion around our natural world narratives with inability to perform skills of interest. One or more artificial rules and logic about how aspects of the simulation work may be implemented to avoid any egregious violations of common expectations. For example, giraffes live in savannas not in the mountains, and penguins eat small fish not deer. In some embodiments, beyond having a narrative and details within the simulation environment that make sense, conceptual parity among building blocks for assessment scenarios and real-world scenarios may be implemented. As an example, the concept of "profit" may be translated into an abstraction similar in nature but logical as a component to a natural world scenario. "Profit" is a composite abstraction, so the analog in a natural world simulation scenario involving, for example, a spreading disease, may be the concept of "transmission," also a composite concept with an underlying mathematical expression defining the concept.

In some embodiments, the variation in the distinct views and scenes for different versions of scenarios may be data-driven. Distinct views and scenes may be generated for different versions of scenarios using the logic associated with potential animals, plants, and terrain features in ways that adhere to human expectations. For example, in the generated scenario, animals that should swarm, swarm, and animals that should fly, fly, while animals that should mingle and meander, navigate the terrain as they would in real life. Everything less obvious in our daily perception of nature, plants, rocks, or the slope of terrain, may adhere to real-world rules as well so that the background of scenes in scenarios stays in the background of assessment.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

The online gaming platform may also support use of virtual objects that mimic physical objects (rigid body objects) within a virtual environment. For example, the online gaming platform may enable users to design and introduce various categories of virtual objects, e.g., vehicles, weapons and weapon accessories, toys, structures, etc. These objects may be viewed by one or more users within a virtual environment supported by the online gaming platform. For example, motion of such objects within the virtual environment may be displayed on user devices.

An online gaming platform may also allow users (developers) of the platform to create new objects and/or mechanisms. For example, users of the online gaming platform may be enabled to create, design, and/or customize new objects such as vehicles, tools, toys, and make them available to other users.

The online gaming platform (also referred to as a game platform) may provide tools to support simulation of objects and mechanisms within a virtual environment. In some implementations, a rendering engine, physics engine and/or physics solver may be utilized for the simulation of objects.

Some objects and/or parameters within a virtual environment may be such that the complexity of simulating the objects and environment may be computationally expensive to enable the simulation to meet time requirements for real-time simulation and rendering of the object. For example, a representation of a novel object may have to be performed within a time period that meets requirements for a particular frame refresh rate of a display device. Failure to meet the time requirement can lead to jittery updates, leading to a poor visual experience for the user.

An objective of a game platform owner or administrator is superior user experience for its users. A technical problem for online gaming platform operators is accurate, timely, and computationally efficient generation of object representations within a virtual environment.

Techniques are described for the use of homeomorphic template mesh as a single parametrization within a machine learning (ML) model framework to generate 3D meshes based on deformation of template 3D meshes. The geometry of the template serves as a prior that can ease the learning problem and enable training of machine learning models even when limited training data is available. Per techniques described herein, through the training, the ML model implicitly learns the geometry correlations of portions of objects. In the case of rigged templates, the deformed template can inherit that rig thus enabling efficient transfer of animations based on the rig to various objects.

Providing variation in the distinct views and scenes for different versions of scenarios and providing assets that are realistic can be time-consuming to create from scratch and/or prohibitively expensive to purchase. In some embodiments, in order to provide a scalable approach to generate distinct views and scenes for different versions of scenarios, the system generates assets using 2D to 3D reconstruction, or taking a single image as an input and representing the object of interest in three dimensional space as the output.

For example, approaches for 3D surface generation, such as AtlasNet, which is composed of a union of learnable parameterizations, may be used. These learnable parameterizations may transform a set of 2D squares to the surface. The parameters of the transformations may come both from the learned weights of a neural network and a learned representation of the shape. For example, the learned parametric transformation may map locally everywhere to a surface, naturally adapt to its underlying complexity, be sampled at any desired resolution, and allow for the transfer of a texture map to the generated surface.

Three-dimensional reconstruction involving meshes for objects, e.g., fish, mammals, etc., poses a challenge. To address these shortcomings, a template mesh is proposed as the domain of parameterization, such as a homeomorphic template mesh. This homeomorphic function is a one-to-one mapping between sets such that both the function and its inverse are continuous and that in topology exists for geometric figures which can be transformed one into the other by an elastic deformation. The geometry of the template mesh may serve as a prior that significantly eases the learning process, particularly in instances where limited training data is available. For example, the network may implicitly learn geometrical correlations such that, e.g., fins for a fish in the template mesh align with fins for a fish in an input image. If the template mesh was animated by rigging, the template mesh may inherit that animation even after it has been deformed. Rigging is a technique used in animation for representing a 3D model using a series of interconnected digital bones. Specifically, rigging refers to the process of creating the bone structure of the 3D model. For example, a 3D model where a deer has been deformed into a horse may inherit the deer's animation.

By generating objects (assets) for simulation-based assessments, such as biological assets, costs associated with a traditional art and animation team may be reduced. Further, because it may take some time to generate assets, there is no latency if they are precomputed. In some embodiments, generated assets may be enhanced offline by an artist to ensure that they look realistic. In some embodiments, the asset generation pipeline may be used to generate an asset from a stock image, for which there is neither multiple perspectives of the same image nor perspective consistency between images. In some embodiments, multiple input images may be used to leverage the information from having full perspective coverage.

In some aspects, the described systems and methods provide for one or more models to generate a three-dimensional reconstruction from a two-dimensional image of an object.

FIG. 1 is a diagram of an example network environment for computer-based assessment, in accordance with some implementations. FIG. 1 illustrates an example network environment 100, in accordance with some implementations of the disclosure. The network environment 100 (also referred to as "system" herein) includes an online assessment platform 102, a client device 110, and a network 122. The online assessment platform 102 can include, among other things, an assessment engine 104, one or more assessments 105, an accessibility engine 107, and a data store 108.

The client device 110 can include a virtual assessment 112, an accessibility application 113, and a display screen 114, to interact with the online assessment platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online assessment platform 102 can include a server having one or more computing devices (e.g., a cloud computing system, a rackmount server, a server computer, cluster of physical servers, virtual server, etc.). In some implementations, a server may be included in the online assessment platform 102, be an independent system, or be part of another system or platform.

In some implementations, the online assessment platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online assessment platform 102 and to provide a user with access to online assessment platform 102. The online assessment platform 102 may also include a website (e.g., one or more web pages) or application back-end software that may be used to provide a user with access to content provided by online assessment platform 102. For example, users (or proctors) may access online assessment platform 102 using the accessibility application 113 on client device 110, respectively.

In some implementations, online assessment platform 102 may provide connections between one or more assessment providers and/or employers that allows proctors (e.g., the persons administering an assessment) to communicate with other proctors via the online assessment platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., testing or assessment user) being an entity controlled by a set of users or a group being assessed as to work skills and communication skills. For example, a set of individual users federated as a group being assessed may be considered a "user," in some circumstances.

In some implementations, online assessment platform 102 may include digital asset and digital assessment generation provisions. For example, the platform may provide administrator interfaces allowing the design, modification, unique tailoring for individuals, and other modification functions. In some implementations, assessments may include two-dimensional (2D) games, three-dimensional (3D) games, virtual reality (VR) games, or augmented reality (AR) games, for example. In some implementations, assessment creators and/or proctors may search for assessments, combine portions of assessments, tailor assessments for particular activities (e.g., group assessments), and other features provided through the assessment platform 102.

In some implementations, online assessment platform 102 or client device 110 may include the assessment engine 104 or virtual assessment 112. In some implementations, assessment engine 104 may be used for the development or execution of assessments 105. For example, assessment engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the assessment engine 104 may generate commands that help compute and render the assessment (e.g., rendering commands, collision commands, physics commands, etc.).

The online assessment platform 102 using assessment engine 104 may perform some or all the assessment engine functions (e.g., generate physics commands, rendering commands, etc.), or offload some or all the assessment engine functions to assessment engine 104 of client device 110 (not illustrated). In some implementations, each assessment 105 may have a different ratio between the assessment engine functions that are performed on the online assessment platform 102 and the assessment engine functions that are performed on the client device 110.

In some implementations, assessment instructions may refer to instructions that allow a client device 110 to render gameplay, graphics, and other features of an assessment, such as a natural world rendering having a logical problem represented therein. The instructions may include one or more of user input (e.g., physical object positioning), character position and velocity information, or commands (e.g., physics commands, rendering commands, collision commands, etc.). The instructions may be audibly prompted by an assessment proctor, audibly presented by a speech synthesizer, physically represented by haptic feedback (e.g., vibration at borders, misalignment, etc.), or a combination of the same.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online assessment platform 102 at any given moment. It may be noted that the number of client devices 110 is provided as illustration, rather than limitation. In some implementations, any number of client devices 110 may be used.

In some implementations, each client device 110 may include an instance of the virtual assessment 112. The virtual assessment 112 may be representative of an educational assessment examination, a vocational assessment examination, or any suitable assessment, whether standardized or uniquely tailored to a particular individual or group of individuals.

Figure 2:
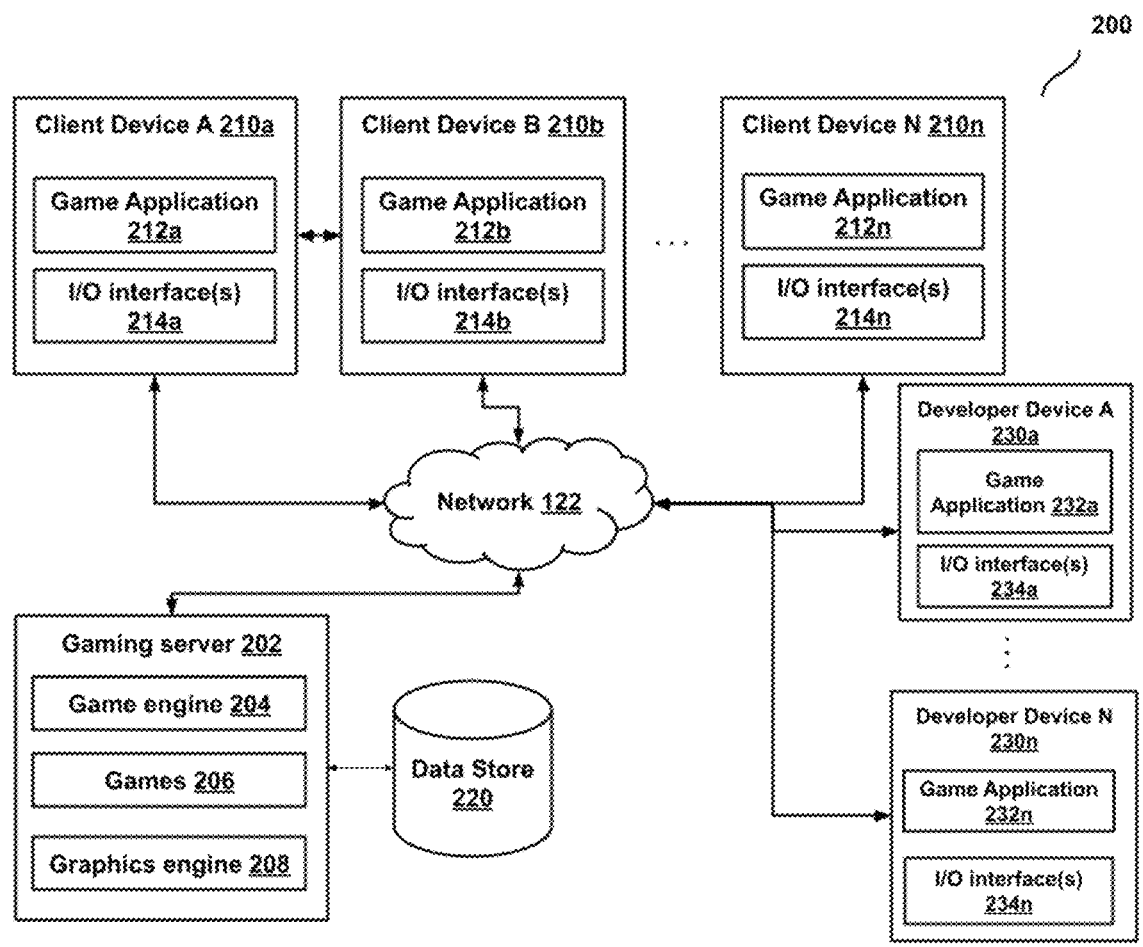
FIG. 2 is a diagram of an example system architecture to generate 3D meshes of objects from 2D images, in accordance with some implementations.

FIG. 2 is a diagram of an example system architecture to generate 3D meshes from 2D images in an online gaming context, in accordance with some implementations. FIG. 2 and the other figures use like reference numerals to identify like elements. A letter after a reference numeral, such as "210," indicates that the text refers specifically to the element having that particular reference numeral. A reference numeral in the text without a following letter, such as "210," refers to any or all of the elements in the figures bearing that reference numeral (e.g. "210" in the text refers to reference numerals "210a," "210b," and/or "210n" in the figures).

The system architecture 200 (also referred to as "system" herein) includes online gaming server 202, data store 220, client devices 210a, 210b, and 210n (generally referred to as "client device(s) 210" herein), and developer devices 230a and 230n (generally referred to as "developer device(s) 230" herein). Gaming server 202, data store 220, client devices 220, and developer devices 230 are coupled via network 122. In some implementations, client devices(s) 210 and developer device(s) 230 may refer to the same or same type of device.

Online gaming server 202 can include, among other things, a game engine 204, one or more games 206, and graphics engine 208. In some implementations, the graphics engine 208 may be a system, application, or module that permits the online gaming server 202 to provide graphics and animation capability. In some implementations, the graphics engine 208 may perform one or more of the operations described below in connection with the flowchart shown in FIG. 3 or 4, or the process of FIG. 5A or FIG. 5B. A client device 210 can include a game application 212, and input/output (I/O) interfaces 214 (e.g., input/output devices). The input/output devices can include one or more of a microphone, speakers, headphones, display device, mouse, keyboard, game controller, touchscreen, virtual reality consoles, etc.

A developer device 230 can include a game application 232, and input/output (I/O) interfaces 234 (e.g., input/output devices). The input/output devices can include one or more of a microphone, speakers, headphones, display device, mouse, keyboard, game controller, touchscreen, virtual reality consoles, etc.

System architecture 200 is provided for illustration. In different implementations, the system architecture 200 may include the same, fewer, more, or different elements configured in the same or different manner as that shown in FIG. 2.

In some implementations, network 222 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 220 may be a non-transitory computer readable memory (e.g., random access memory), a cache, a drive (e.g., a hard drive), a flash drive, a database system, or another type of component or device capable of storing data. The data store 220 may also include multiple storage components (e.g., multiple drives or multiple databases) that may also span multiple computing devices (e.g., multiple server computers). In some implementations, data store 220 may include cloud-based storage.

In some implementations, the online gaming server 202 can include a server having one or more computing devices (e.g., a cloud computing system, a rackmount server, a server computer, cluster of physical servers, etc.). In some implementations, the online gaming server 202 may be an independent system, may include multiple servers, or be part of another system or server.

In some implementations, the online gaming server 202 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 202 and to provide a user with access to online gaming server 202. The online gaming server 202 may also include a website (e.g., a web page) or application back-end software that may be used to provide a user with access to content provided by online gaming server 202. For example, users may access online gaming server 202 using the game application 212 on client devices 210.

In some implementations, gameplay session data are generated via online gaming server 202, game application 212, and/or game application 232, and are stored in data store 220. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc.

In some implementations, the chat transcripts are generated via game application 212 and/or game application 232 or and are stored in data store 220. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 220.

In some implementations, chat transcripts may be stored in the form of conversations between participants based on the timestamps. In some implementations, the chat transcripts may be stored based on the originator of the message(s). In some implementations, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 202 may be a virtual gaming server. For example, the gaming server may provide single-player or multiplayer games to a community of users that may access or interact with games using client devices 210 via network 222. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 210) within a game (e.g., 206) or the presentation of the interaction on a display or other output device (e.g., 214) of a client device 210.

In some implementations, a game 206 can include an electronic file that can be executed or loaded using software, firmware or hardware configured to present the game content (e.g., digital media item) to an entity. In some implementations, a game application 212 may be executed and a game 206 rendered in connection with a game engine 204. In some implementations, a game 206 may have a common set of rules or common goal, and the environment of a game 206 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 206 may be collectively referred to as a "world" or "gaming world" or "virtual world" or "universe" herein. An example of a world may be a 3D world of a game 206. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 202 can host one or more games 206 and can permit users to interact with the games 206 using a game application 212 of client devices 210. Users of the online gaming server 202 may play, create, interact with, or build games 206, communicate with other users, and/or create and build objects (e.g., also referred to as "item(s)" or "game objects" or "virtual game item(s)" herein) of games 206.

For example, in generating user-generated virtual items, users may create characters, decoration for the characters, one or more virtual environments for an interactive game, or build structures used in a game 206, among others. In some implementations, users may buy, sell, or trade game virtual game objects, such as in-platform currency (e.g., virtual currency), with other users of the online gaming server 202. In some implementations, online gaming server 202 may transmit game content to game applications (e.g., 212). In some implementations, game content (also referred to as "content" herein) may refer to any data or software instructions (e.g., game objects, game, user information, video, images, commands, media item, etc.) associated with online gaming server 202 or game applications. In some implementations, game objects (e.g., also referred to as "item(s)" or "objects" or "virtual objects" or "virtual game item(s)"

herein) may refer to objects that are used, created, shared or otherwise depicted in game applications 206 of the online gaming server 202 or game applications 212 of the client devices 210. For example, game objects may include a part, model, character, accessories, tools, weapons, clothing, buildings, vehicles, currency, flora, fauna, components of the aforementioned (e.g., windows of a building), and so forth.

In some implementations, a game 206 may be associated with a particular user or a particular group of users (e.g., a private game), or made widely available to users with access to the online gaming server 202 (e.g., a public game). In some implementations, where online gaming server 202 associates one or more games 206 with a specific user or group of users, online gaming server 202 may associate the specific user(s) with a game 206 using user account information (e.g., a user account identifier such as username and password).

In some implementations, online gaming server 202 or client devices 210 may include a game engine 204 or game application 212. In some implementations, game engine 204 may be used for the development or execution of games 206. For example, game engine 204 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 204 may generate commands that help compute and render the game (e.g., rendering commands, collision commands, physics commands, etc.) In some implementations, game applications 212 of client devices 210/216, respectively, may work independently, in collaboration with game engine 204 of online gaming server 202, or a combination of both.

In some implementations, both the online gaming server 202 and client devices 210 may execute a game engine (204 and 212, respectively). The online gaming server 202 using game engine 204 may perform some or all the game engine functions (e.g., generate physics commands, rendering commands, etc.), or offload some or all the game engine functions to game engine 204 of client device 210. In some implementations, each game 206 may have a different ratio between the game engine functions that are performed on the online gaming server 202 and the game engine functions that are performed on the client devices 210. For example, the game engine 204 of the online gaming server 202 may be used to generate physics commands in cases where there is a collision between at least two game objects, while the additional game engine functionality (e.g., generate rendering commands) may be offloaded to the client device 210. In some implementations, the ratio of game engine functions performed on the online gaming server 202 and client device 210 may be changed (e.g., dynamically) based on gameplay conditions. For example, if the number of users participating in gameplay of a particular game 206 exceeds a threshold number, the online gaming server 202 may perform one or more game engine functions that were previously performed by the client devices 210.

For example, users may be playing a game 206 on client devices 210, and may send control instructions (e.g., user inputs, such as right, left, up, down, user election, or character position and velocity information, etc.) to the online gaming server 202. Subsequent to receiving control instructions from the client devices 210, the online gaming server 202 may send gameplay instructions (e.g., position and velocity information of the characters participating in the group gameplay or commands, such as rendering commands, collision commands, etc.) to the client devices 210 based on control instructions. For instance, the online gaming server 202 may perform one or more logical operations (e.g., using game engine 204) on the control instructions to generate gameplay instruction(s) for the client devices 210. In other instances, online gaming server 202 may pass one or more or the control instructions from one client device 210 to other client devices (e.g., from client device 210a to client device 210b) participating in the game 206. The client devices 210 may use the gameplay instructions and render the gameplay for presentation on the displays of client devices 210.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 202. In other implementations, the control instructions may be sent from a client device 210 to another client device (e.g., from client device 210b to client device 210n), where the other client device generates gameplay instructions using the local game engine 204. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 210 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc. One or more characters (also referred to as an "avatar" or "model" herein) may be associated with a user where the user may control the character to facilitate a user's interaction with the game 206.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, a component, such as a body part, may be a primitive geometrical shape such as a block, a cylinder, a sphere, etc., or some other primitive shape such as a wedge, a torus, a tube, a channel, etc. In some implementations, a component may be a biological asset, such as a mammal, fish, or bird. In some implementations, a creator module may publish a user's character for view or use by other users of the online gaming server 202. In some implementations, creating, modifying, or customizing characters, other game objects, games 206, or game environments may be performed by a user using a I/O interface (e.g., developer interface) and with or without scripting, or with or without an application programming interface (API). It may be noted that for purposes of illustration, characters are described as having a humanoid form. It may further be noted that characters may have any form such as a vehicle, animal, inanimate object, or other creative form.

In some implementations, the online gaming server 202 may store characters created by users in the data store 220. In some implementations, the online gaming server 202 maintains a character catalog and game catalog that may be presented to users. In some implementations, the game catalog includes images of games stored on the online gaming server 202. In addition, a user may select a character (e.g., a character created by the user or other user) from the character catalog to participate in the chosen game. The character catalog includes images of characters stored on the online gaming server 202. In some implementations, one or more of the characters in the character catalog may have been created or customized by the user. In some implementations, the chosen character may have character settings defining one or more of the components of the character.

In some implementations, the client device(s) 210 may each include computing devices such as personal computers (PCs), mobile devices (e.g., laptops, mobile phones, smart phones, tablet computers, or netbook computers), network-connected televisions, gaming consoles, etc. In some implementations, a client device 210 may also be referred to as a "user device." In some implementations, one or more client devices 210 may connect to the online gaming server 202 at any given moment. It may be noted that the number of client devices 210 is provided as illustration. In some implementations, any number of client devices 210 may be used.

In some implementations, each client device 210 may include an instance of the game application 212, respectively. In one implementation, the game application 212 may permit users to use and interact with online gaming server 202, such as control a virtual character in a virtual game hosted by online gaming server 202, or view or upload content, such as games 206, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 210 and allows users to interact with online gaming server 202. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 202 as well as interact with online gaming server 202 (e.g., play games 206 hosted by online gaming server 202). As such, the game application may be provided to the client device(s) 210 by the online gaming server 202. In another example, the game application may be an application that is downloaded from a server.

In some implementations, each developer device 230 may include an instance of the game application 232, respectively. In one implementation, the game application 232 may permit a developer user(s) to use and interact with online gaming server 202, such as control a virtual character in a virtual game hosted by online gaming server 202, or view or upload content, such as games 206, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 230 and allows users to interact with online gaming server 202. The game application may render, display, or present the content (e.g., a web page, a media viewer) to a user. In an implementation, the game application may also include an embedded media player (e.g., a Flash® player) that is embedded in a web page.

According to aspects of the disclosure, the game application 232 may be an online gaming server application for users to build, create, edit, upload content to the online gaming server 202 as well as interact with online gaming server 202 (e.g., provide and/or play games 206 hosted by online gaming server 202). As such, the game application may be provided to the client device(s) 230 by the online gaming server 202. In another example, the game application 232 may be an application that is downloaded from a server. Game application 232 may be configured to interact with online gaming server 202 and obtain access to user credentials, user currency, etc. for one or more games 206 developed, hosted, or provided by a game developer.

In general, functions described in one implementation as being performed by the online gaming server 202 can also be performed by the client device(s) 210, or a server, in other implementations if appropriate. In addition, the functionality attributed to a particular component can be performed by different or multiple components operating together. The online gaming server 202 can also be accessed as a service provided to other systems or devices through appropriate application programming interfaces (APIs), and thus is not limited to use in websites.

Figure 3:
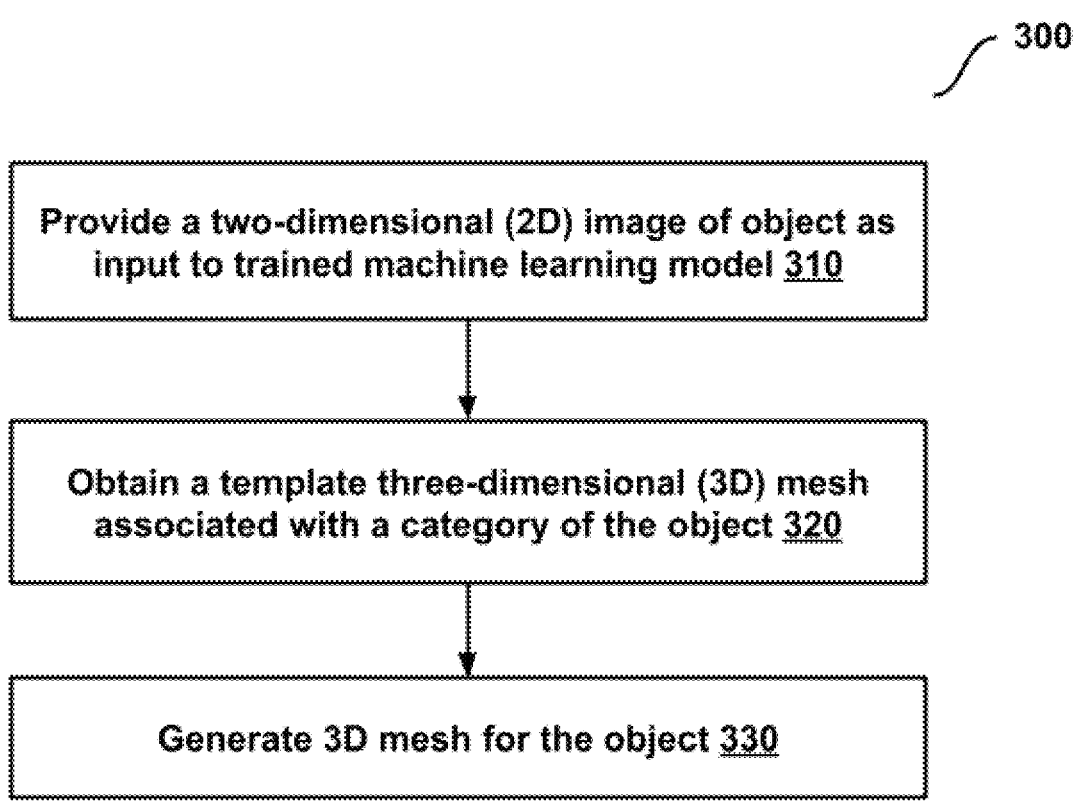
FIG. 3 depicts an example method to generate a 3D mesh of an object from a 2D image using a trained machine learning (ML) model, in accordance with some implementations.

FIG. 3 depicts an example method 300 for generation of a 3D mesh of an object from a 2D image using a trained machine learning (ML) model, in accordance with some implementations. In some implementations, method 300 can be implemented, for example, on the online assessment platform 102 or gaming server 202 described with reference to FIG. 1 and FIG. 2, respectively. In some implementations, some or all of the method 300 can be implemented on one or more client devices 110 and/or 210 as shown in FIGS. 1 and 2, on one or more developer devices 230, or on one or more server device(s) 202, and/or on a combination of developer device(s), server device(s) and client device(s). In described examples, the implementing system includes one or more digital processors or processing circuitry ("processors"), and one or more storage devices (e.g., a datastore 220, data store 108, or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

Method 300 may begin at block 310. At block 310, a two-dimensional (2D) image of an object is provided as input to a trained machine learning model. The 2D image may be retrieved from a data store or be provided as user input by a user. The object may be a representation of an object that is part of the virtual environment, e.g., a biological object such as an animal, a fish, mammal, bird, etc., or an artificial object such as an automobile, plane, etc., that is included in an assessment or gaming environment. The 2D image may include an image of an object that was not previously provided as input to the ML model(s), or may be an image of an object previously provided as input to the ML model(s). In some implementations, the 2D image may be a photograph of a real object. Block 310 may be followed by block 320.

At block 320, a template three-dimensional (3D) mesh associated with an object is obtained. In some implementations, a category of the object may be determined based on an image analysis of the provided 2D image. As described earlier, objects and/or characters in virtual environments may be implemented as a 3D model and may include a surface representation used to draw the object/character (also known as a skin or mesh) and a hierarchical set of interconnected bones (also known as a skeleton or rig). The rig may be utilized to animate the character and to simulate motion and action by the object. The 3D model may be represented as a data structure, and one or more parameters of the data structure may be modified to change various properties (attributes) of the object and/or character, e.g., dimensions (height, width, girth, etc.); body type; movement style; number/type of body parts; proportion (e.g., shoulder and hip ratio); head size; etc.

In some implementations, the template 3D mesh is a homeomorphic template mesh. The template 3D mesh may be selected from a set of previously generated and stored, template meshes, and may include both user generated and automatically generated meshes. In some implementations, multiple template meshes may be presented to the user and a template mesh selected based on input received from a user. In some implementations, a plurality of template meshes may be selected for the performance of methods 300. Block 320 may be followed by block 330.

At block 330, a 3D mesh for the object is generated using the trained machine learning model based on the 2D image and the template 3D mesh. In some implementations, the trained machine learning model may include an artificial neural network (ANN), e.g., a feedforward ANN such as a multilayer perceptron (MLP). In some implementations, the trained machine learning model may include a mesh encoder, an image encoder, and a plurality of mesh decoders that are trained to generate a 3D mesh of an object based on a 2D image of the object.

The machine learning model is trained using a variety of objects and their corresponding geometries, meshes, and images. Additional details of the training of the machine learning model are described in greater detail with reference to FIG. 4 and FIGS. 5A-5B.

In some implementations, an image encoder is utilized to encode the provided 2D image into a shape space vector. The shape space vector may be an n-dimensional vector that is a reduced dimension representation of the provided 2D image. A mesh decoder associated with a category of the object is utilized to decode the shape space vector into the 3D mesh of the object by deforming the template 3D mesh, whereby vertices of the template mesh adjusted (moved) based on the shape space vector by utilizing a homeomorphic transformation that preserves the topological properties of the template 3D mesh. In some implementations, the 3D mesh for the object generated by deforming the template 3D mesh may be displayed via a user interface.

In some implementations, prior to obtaining the template 3D mesh, the category of the object may be determined based on the 2D image using image matching. In some implementations, image segmentation may be performed to determine a category of the object. In some implementations, the category of the object may be specified based on user input.

In some implementations, one or more textures from the 2D image may be mapped to the 3D mesh of the object, depending on texture information in the 2D image. In some implementations, a semantic segmentation may be performed, and texture information from different portions of the 2D image may be mapped to corresponding portions of the 3D mesh of the object.

In some implementations, the template 3D mesh is associated with a rig that includes a plurality of vertices (joints) of the mesh arranged in space. The rig may include a hierarchical set of interconnected parts (called bones, and which collectively form the skeleton or rig). In such implementations, each vertex of the plurality of vertices is connected to at least one other vertex of the plurality of joints.

One or more animations associated with the template 3D mesh may be predefined such that each template animation includes movement of two or more of the plurality of vertices to simulate motion of the underlying object. Utilization of a homeomorphic template 3D mesh enables reuse of the template animation in the generated 3D mesh of the object, which is obtained by deforming the template 3D mesh.

In some implementations, at least one object animation for the object may be generated that is based on the 3D mesh for the object and the one or more template animations associated with the template 3D mesh that includes movement of the same two or more vertices as in a corresponding template animation of the one or more (predefined) template animations.

In some implementations, a UV regressor may be utilized to apply a texture to the deformed mesh corresponding to the object. In some implementations, the UV regressor may be utilized to generate a mapping from vertices of the 3D mesh of the object to the 2D image, wherein the mapping is used to apply a texture to the 3D mesh of the object.

UV mapping is the 3D modeling process of projecting a 2D image to a 3D model's surface for texture mapping. The letters "U" and "V" can denote the axes of the 2D texture where "X," "Y," and "Z" denote the axes of the 3D object in model space. Vertices may be assigned UV coordinates by tracing which pixels in the depth image project down to which vertices in the 3D model. These coordinates may indicate the pixel location in the texture image to which a vertex corresponds. For example, if the texture image is of size (256, 512) and a vertex projects to the pixel at (112, 234), the UV coordinates for that vertex are (112/256, 234/512)=(0.4375, 0.457).

In some implementations, a machine learning model may utilize the two-dimensional image of the object and the corresponding deformed mesh to generate a UV mapping from vertices of the deformed mesh to the second two-dimensional image for the object. The ML model may be a trained statistical model that is fine-tuned to perform fine-grained semantic segmentation on sets of predefined descriptors, e.g., a dataset including animals, mammals, or fish. These descriptors may be used to guide a regression through UV space. For example, the trained statistical model may be a trained Deeplab model or another suitable model. In some embodiments, the UV regressor may attempt to "cast a net" over a given image in UV space. Instead of warping the image to fit the mesh, the ML model may learn how to project the mesh onto the image. The input image may be the same image used for 3D reconstruction, so this regressor may be run as part of an automated 3D reconstruction pipeline. In some embodiments any image with a sufficiently large portion of the animal visible may be usable, so multiple textures may be applied to the same mesh. The input may be a novel 2D Image A and a Source Mesh B. B may be segmented with the same descriptors that the Deeplab model was trained on to produce images. The output may be a UV mapping from the vertices of B to A. It may not be required that B have a predefined UV map, but if it does, the UVs that the UV regressor produces can be inherited into the old UV map.

In some embodiments, the training of the UV regressor may include training a network, e.g., AtlasNet, to learn a map from the mesh surface to the image domain using a descriptor loss. The input image may be processed by a description net to obtain each pixel's descriptor. Each iteration, points for each descriptor class may be sampled from the mesh surface and from the target image. The network may be used to map the sampled mesh points into the UV space of the image. The regression may use AdamOptimizer (e.g., with learning rate 0.0001) to minimize the descriptor loss. The network may be pre-trained using a mean-squared loss with the UV coordinates generated from a side-view perspective projection of the mesh. The UV regressor may be trained using a loss function that includes a descriptor loss based on a Chamfer distance.

The training of the network may continue using the descriptor loss, which is defined as follows:

Descriptor loss: Let Qj be the set of N sampled points from the image for descriptor class j, and let Rj be the set of M sampled points from the mesh for descriptor class j. The loss is the sum over j of Chamfer_distance(Qj, Rj) for j in J, where J is the set of all descriptor classes, and where Chamfer distance is the sum over the distances to the nearest neighbor for each point in the mesh.

Just as a map from template mesh surface to a target mesh surface can be generated, a map from a template mesh surface to a 2D image may be generated for the purposes of texturing. In some implementations/embodiments, a decoder for texturing may include five fully-connected layers with output sizes of 1024, 512, 256, 128, and 2, respectively. Each layer may use a rectified linear unit (ReLU) activation function except the final layer, which may have no activation.

In some embodiments, the texturing is most information-rich with a target image that contains as most of the object in question as possible (e.g., a head-on view of an animal has less information from which to texture the mesh than a side view). Better results may be produced when the images contain animals in an approximately side-view perspective than for other perspectives. For example, the model may be primed by pretraining it using a mean-squared loss with the UV coordinates generated from a side-view perspective projection of the mesh.

However, it may be unlikely that a perfect side-view target image is received, and because at every iteration a map is learned from the entire surface of the mesh to the target image, one side will end up matching the image better than the other. It follows that when trying to texture the mesh, the textures on either side of the plane of symmetry may be inconsistent and unrealistic. To solve this, at the conclusion of the regression, the descriptor loss for each side of the mesh is computed separately, and the side with the smallest value is utilized as the basis for the UV map for the entire mesh by reflection. In some embodiments, AdamOptimizer may be used across training with the following learning parameters: learning rate=0.0001; beta1=0.9; beta2=0.999; Total # of epochs=1000.

Figure 4:
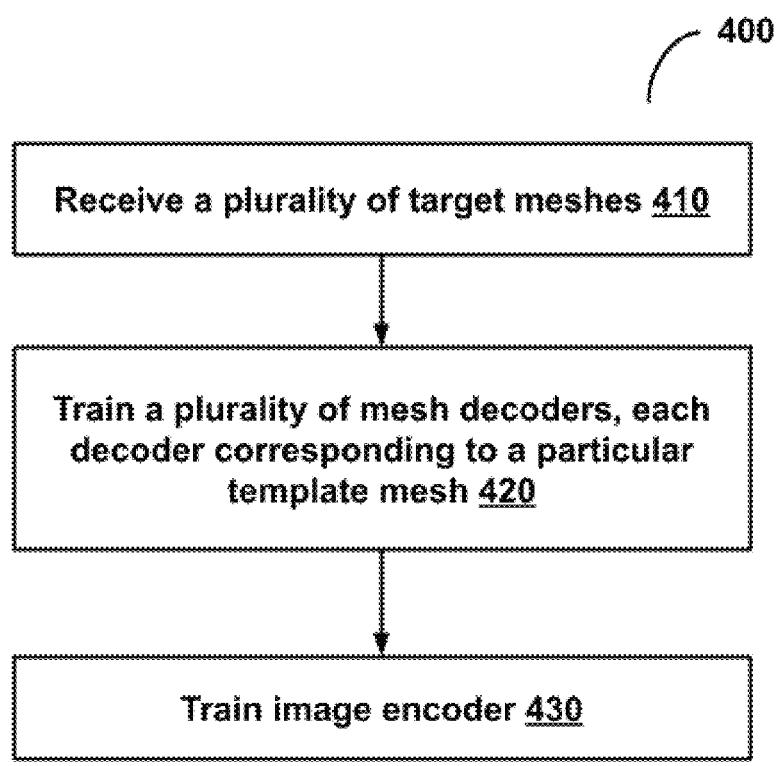
FIG. 4 is a flowchart illustrating an example method to train an image encoder, in accordance with some implementations.

FIG. 4 is a flowchart illustrating an example method to train an image encoder, in accordance with some implementations.

In some implementations, method 400 can be implemented, for example, on a server 202 described with reference to FIG. 2. In some implementations, some or all of the method 400 can be implemented on one or more client devices 210 as shown in FIG. 2, on one or more developer devices 230, or on one or more server device(s) 202, and/or on a combination of developer device(s), server device(s) and client device(s). In described examples, the implementing system includes one or more digital processors or processing circuitry ("processors"), and one or more storage devices (e.g., a datastore 220 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., an accuracy of 3D mesh generation of objects falling below a threshold, new categories of object(s) added to the assessment platform or the gaming platform, a predetermined time period having expired since the last performance of method 400, and/or one or more other conditions occurring which can be specified in settings read by the method.

In this illustrative example, the ML model is an artificial neural network that includes a mesh encoder, an image encoder, and a plurality of mesh decoders to generate a three-dimensional mesh from a two-dimensional image of an object.

Method 400 may begin at block 410. At block 410, a plurality of target meshes are received. Block 410 may be followed by block 420.

At block 420, the mesh encoder and the plurality of mesh decoders are trained. In some implementations, a two-stage training may be performed. Each mesh decoder of the plurality of target meshes corresponds to a particular template mesh. In some implementations, a two-stage training may be performed and repeated over available training target meshes. In some implementations, updating the mesh encoder includes re-training the mesh encoder based on the first value of a first error function, and updating the image encoder includes re-training the image encoder based on a second error function.

In a first stage, the mesh encoder is utilized to encode the particular target mesh into a first shape space vector. A corresponding mesh decoder, that corresponds to a type and/or category of the particular target mesh is utilized to decode the first shape space vector into a deformed mesh.

A first value for a first error function is determined based on a comparison of the target mesh and the deformed mesh and one or more parameters of the mesh decoder are updated based on the first value. The machine learning model is trained based on the first value, which is a measure of a distance of the deformed template mesh from the target mesh. This process may be repeated until the mesh decoder of the machine learning model is trained over a complete set of target meshes.

In a second stage, an image encoder is trained. A plurality of two-dimensional (2D) images of objects are received, wherein each image corresponds to an object of a respective category and wherein the category is associated with a corresponding template mesh. In some implementations, the 2D images may include images of objects that were previously used to train the mesh decoder in Stage 1 of the training described earlier and/or images of objects that were not previously utilized for Stage 1 training.

The image encoder is utilized to generate a shape space vector for each of the plurality of 2D images that are included in a training set of 2D images of objects. The trained mesh encoder from Stage 1 is utilized to generate a shape space vector for each target mesh is the training set.

The shape space vector generated using the image encoder is compared with a corresponding shape space vector associated with the target mesh for the corresponding object, wherein the shape space vector associated with the target mesh is encoded using the mesh encoder. One or more parameters of the image encoder are updated based on the comparing.

A second value for a second error function is determined based on a comparison of the target mesh and the deformed mesh and one or more parameters of the image encoder are updated based on the second value. In some implementations, the second error function is a fitness function that is indicative of a distance of the shape space vector generated from by the mesh encoder to the shape space vector generated using the image encoder.

This process may be repeated until the image encoder of the machine learning model is trained over a complete set of target meshes. In some implementations, one or more of the plurality of mesh decoders may be pre-trained to approximate the identity function on the corresponding template mesh.

Figure 5A:
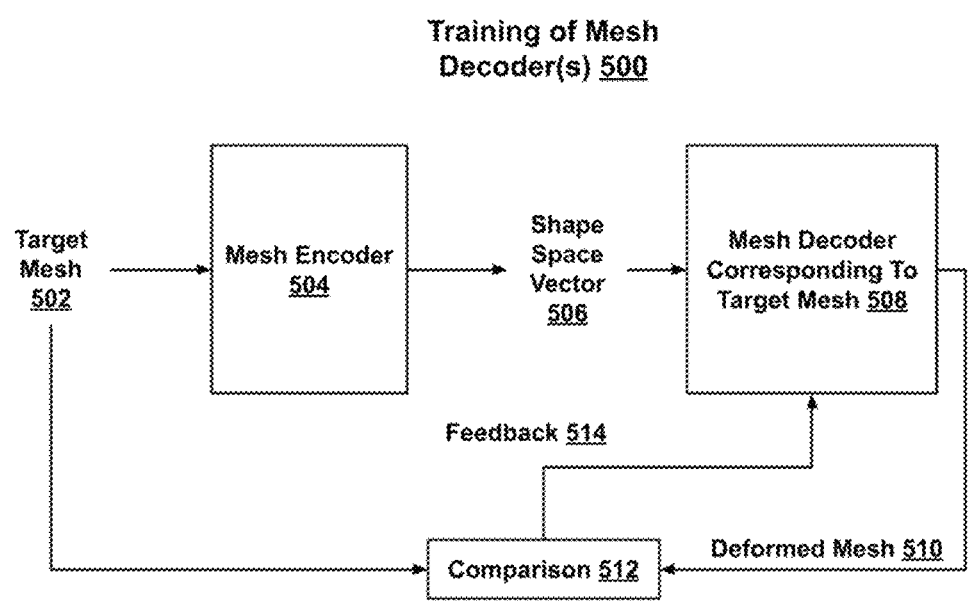
FIG. 5A is a block diagram illustrating an example process to train a mesh decoder to generate a deformed mesh, in accordance with some implementations.
Figure 5B:
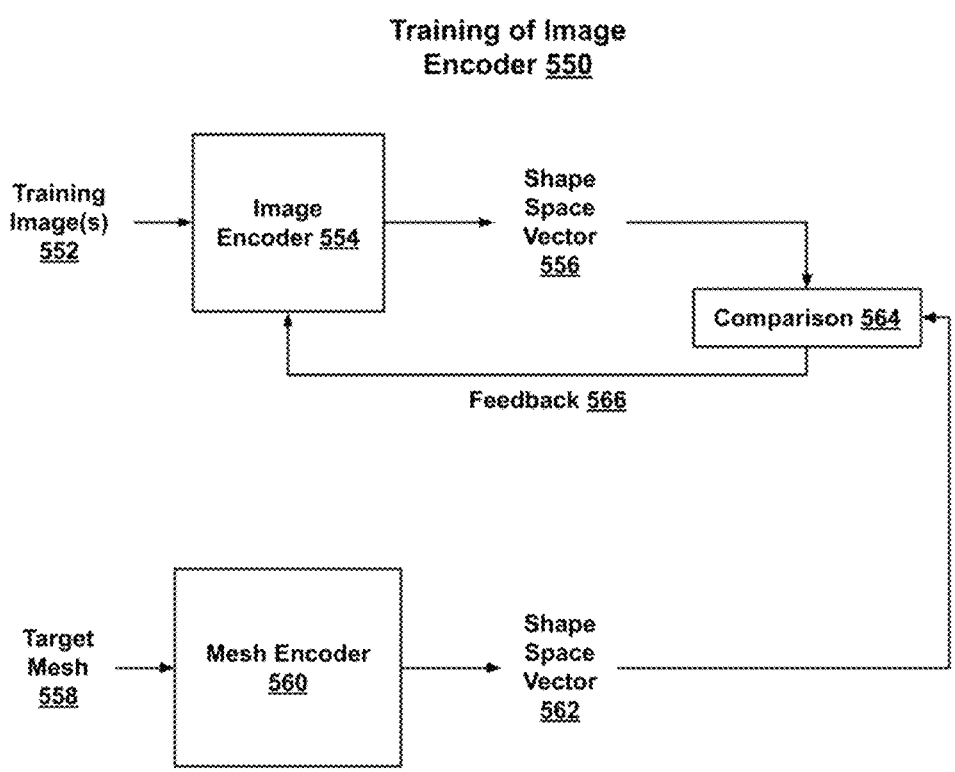
FIG. 5B is a block diagram illustrating an example process to train an image encoder to generate shape space vectors, in accordance with some implementations.

FIG. 5A is a block diagram illustrating an example process to train a mesh decoder to generate a deformed mesh, in accordance with some implementations. FIG. 5B is a block diagram illustrating an example process to train an image encoder to generate shape space vectors, in accordance with some implementations.

In some embodiments, the described systems and methods provide for a 3D reconstruction model including an encoder-decoder architecture, e.g., based on AtlasNet or another suitable approach. Training may occur in two sequential stages, a first stage (500) where the mesh encoder (504) is trained to map point clouds in a target mesh (502) into a latent space represented by a shape space vector (506), and a second stage (550) where an image encoder (554) is trained (550) to map training images (552) into that same latent space (556).

In some implementations, the decoder may be optimized to map the encoded latent vector and random points on the template surface onto the target surface. In some implementations, the decoder may include five fully-connected layers with output sizes of 1024, 512, 256, 128, and 3, respectively. Each layer may include a Rectified Linear Unit (ReLU) activation function except the final layer, which may have no activation. Chamfer distance may be used as the loss across both stages, and may be optimized using, e.g., AdamOptimizer or another suitable approach. During pre-training in the first stage, there may be an additional loss term of mean squared error over the template vertices.

In the first stage of training, the goal may be to learn a "shape space" representing the different possible geometries of the training data. For example, this may include learning an encoding of the geometries as n-dimensional shape space vectors. A template mesh may be received corresponding to a biological asset. The biological asset may be an animal, such as a fish, a mammal, etc. For example, a template mesh may be received that corresponds to a fish.

Using a first statistical model, the template mesh may be encoded into a first shape space vector. For example, the first statistical model may be a mesh encoder that takes the target mesh as input and generates as output an n-dimensional shape space vector.

Using a second statistical model, the first shape space vector may be decoded into a deformed mesh corresponding to the biological asset. For example, the second statistical model may be a mesh decoder that is pre-trained to be approximately the identity function on the template mesh. The mesh decoder may take a shape space vector as input and generate as output a deformed mesh that matches the geometry represented by the shape space vector. There may be multiple mesh decoders, one for each template mesh provided as input to the mesh encoder.

A first value for a first error function based on a comparison (506) of the template mesh and the deformed mesh may be determined. For example, the first error function may be a fitness function that measures how close (a distance of) the deformed mesh is to the target mesh provided as input to the mesh encoder.

Using feedback 514 the first statistical model may be updated based on the first value of the first error function being above a first threshold. For example, the first threshold may indicate an acceptable level of error in how close the deformed mesh is to the target mesh. The mesh encoder may be retrained based on the value of the first error function.

In some embodiments, PointNet or another suitable approach may be used for the encoder during the first stage of training. In some embodiments, the encoder may encode point clouds into a latent space. First, the model may be pretrained on the dataset so that the decoder is approximately the identity function on the template. This has the effect of priming the parameter space toward deformations that are suitable for various purposes, e.g., mapping a texture, animation, etc. Then the model may be trained for 2000 epochs to reconstruct the target point cloud. In some implementations, the following learning parameters may be used: Pointnet learning rate=0.001; beta1=0.9; beta2=0.999; Total # of epochs=2000; Batch size=8.

In the second stage of training, the goal may be to learn how to map images to the shape space vector corresponding to the object, e.g., an animal. The training may proceed using a set of images corresponding to the template meshes provided to the mesh encoder as input.

Subsequent to updating the first statistical model, a two-dimensional image for the object may be received. For example, after the mesh encoder has been trained, a two-dimensional image corresponding to a target mesh provided to the mesh encoder as input may be received.

The updated first statistical model may be utilized to encode the target mesh corresponding to the object into an updated first shape space vector. For example, after the mesh encoder has been trained, using the trained mesh encoder, the target mesh may be encoded by the system into an n-dimensional shape space vector corresponding to the target mesh.

Using a third statistical model, the two-dimensional image may be encoded into a second shape space vector. For example, the third statistical model may be an image encoder which takes an image of an object as input and generates as output an n-dimensional shape space vector.

A second value for a second error function may be determined based on a comparison (564) of the updated first shape space vector and the second shape space vector. For example, the second error function may be a fitness function that measures how close the shape space vector produced by the image encoder is to the shape space vector generated by the mesh encoder.

Using feedback 566, the third statistical model may be updated based on the second value of the second error function being above a second threshold. For example, the second threshold may indicate an acceptable level of error in how close the shape space vector produced by the image encoder is to the shape space vector generated by the mesh encoder. The image encoder may be retrained based on the value of the second error function.

In some embodiments, an object recognition model such as VGG or another suitable approach may be used for the encoder during the second stage of training.

In some embodiments, the encoder may encode images into a latent space. During training, only the last two fully-connected layers of the encoder may be updated during optimization, and the 3D decoder produced from the first stage may be frozen. In some implementations, the following learning parameters may be used: Decoder learning rate=0.001; Vgg learning rate=1e-5; beta1=0.9; beta2=0.999; Total # of epochs=10,000; Batch size=16.

After training is complete, the trained models may be used to generate a three-dimensional reconstruction for a received two-dimensional image of an object. Subsequent to updating the third statistical model, e.g., the image encoder, a novel two-dimensional image for the object may be received.

Using the updated third statistical model, the second two-dimensional image may be encoded into a third shape space vector. For example, the system may be utilized to encode, using the trained image encoder, the two-dimensional image into an n-dimensional shape space vector corresponding to the novel, unseen image of the fish.

The system may be utilized to decode, using the second statistical model, the third shape space vector into a second deformed mesh corresponding to the biological asset. For example, the system may be utilized to decode, using the mesh decoder, the n-dimensional shape space vector corresponding the novel, unseen image of the fish into a corresponding deformed mesh, thereby generating a three-dimensional reconstruction of the fish.

In some embodiments, the system may be utilized to generate a multi-template model that uses K template meshes at the same time (and K corresponding parameterizations). This may aid in learning because it provides for the network to potentially map templates to target mismatches, and moreover, gives the user access to several possible three-dimensional reconstructions so that they can select one suitable for their purposes.

Figure 6:
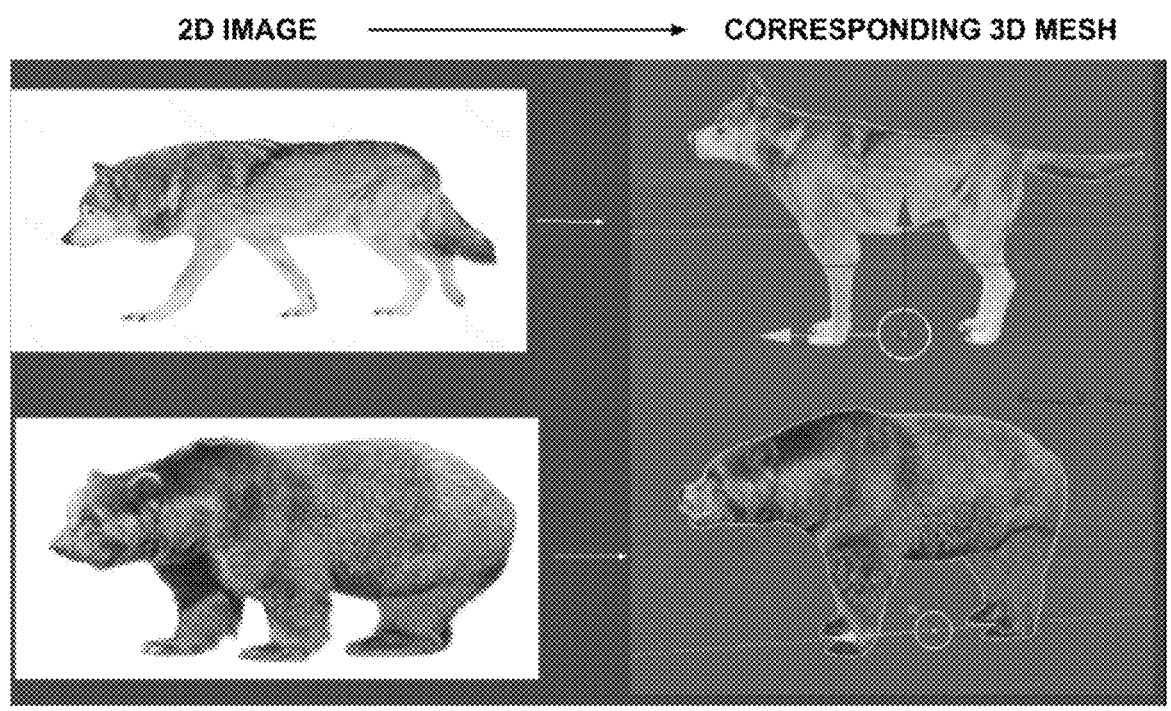
FIG. 6 depicts examples of 3D meshes generated from corresponding 2D images, in accordance with some implementations.

FIG. 6 depicts examples of 3D meshes generated from corresponding 2D images, in accordance with some implementations.

This illustrative example depicts 2D images of a wolf and bear, and corresponding 3D meshes generated using the described method(s). As depicted in FIG. 6, the 3D meshes are deformed meshes that have been deformed based on a template mesh for the category. As depicted in FIG. 6, texture properties are also transferred to provide a more accurate representation of the object.

Figure 7:
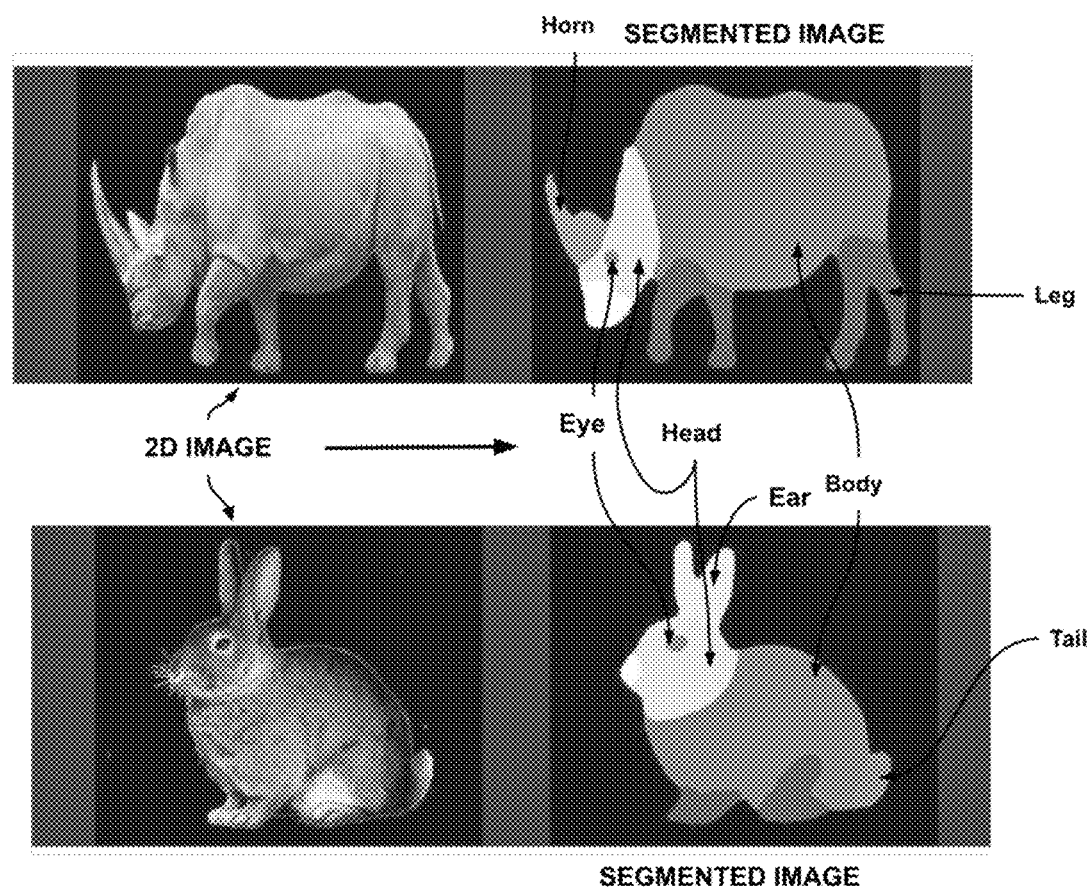
FIG. 7 depicts an example of segmentation of 2D images for classification, in accordance with some implementations.

FIG. 7 depicts an example of segmentation of 2D images for classification, in accordance with some implementations.

Fine-grained semantic segmentation may be performed on a set of predefined descriptors to determine particular portions of an object and to classify the object, determine a category type, etc. In some implementations, a standard Deeplab model may be utilized to perform semantic segmentation. Suitable modifications may be made to specify output classes to match a category of object and/or biological asset. For example, the number of output classes of a standard Deeplab model may be changed to match the number of descriptors (e.g., 8 for mammals, or 3 for fish) and trained with a learning rate of 1E-4. In this illustrative example, the left side of FIG. 7 depicts the input image, and the right side shows results from the trained ML model.

In some implementations, a defined descriptor set for an example set of an object category of mammals may include eye, head, leg, muzzle, ear, tail, horn, and body, and a defined descriptor set for an object category of fish may include eye, body, and fin.

Figure 8:
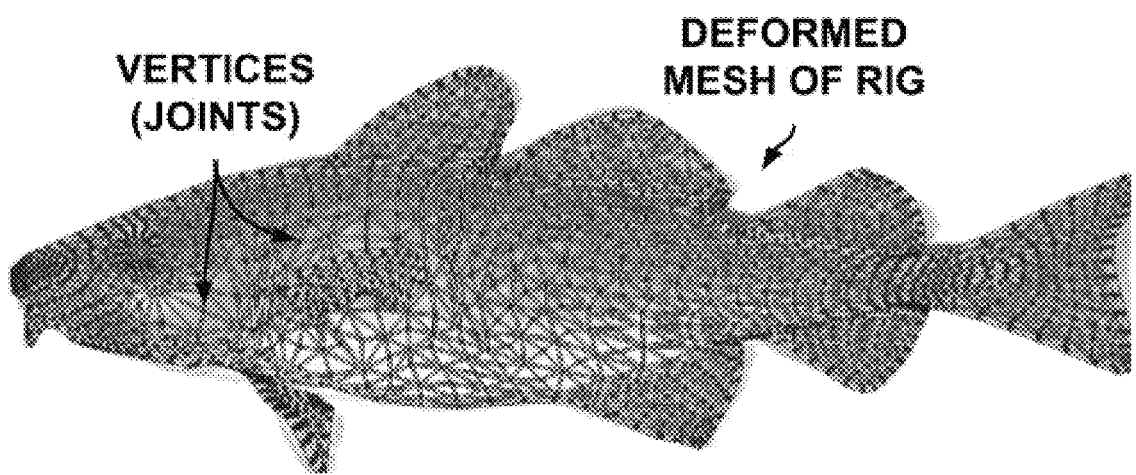
FIG. 8 depicts an example rigged 3D mesh of an object, in accordance with some implementations.

FIG. 8 depicts an example rigged 3D mesh of an object, in accordance with some implementations.

Figure 9:
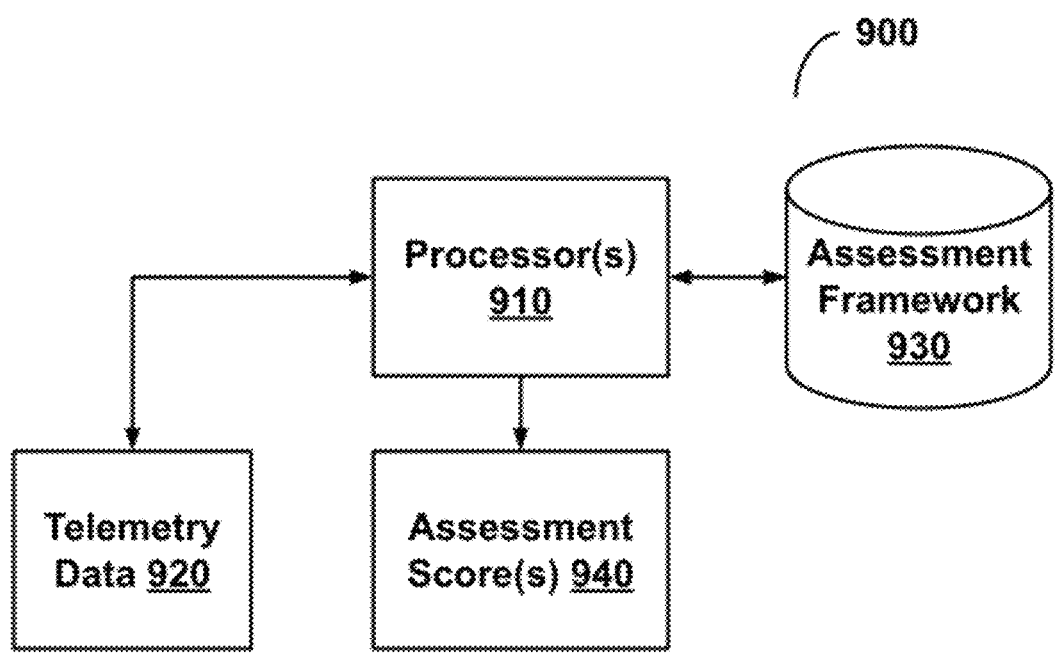
FIG. 9 depicts an example assessment framework, in accordance with some implementations.

In this illustrative example, the object is a biological asset (bear). FIG. 8 depicts a mesh superimposed on a 2D image. As depicted in FIG. 9, the deformed mesh includes a plurality of connected joints, which may be utilized to animate the 3D object in a virtual environment, e.g., depict a car moving, a fish swimming, an animal running, etc.

FIG. 9 depicts an example assessment framework, in accordance with some implementations.

In some aspects, one example implementation of the described systems and methods is shown in FIG. 9. In particular, FIG. 9 shows an example implementation of a system for computing an assessment score in accordance with some embodiments of the technology described herein. In particular, system 900 may include one or more processors 910 that are operable to generate an assessment score for a user (e.g., element 940). Such information may be stored within memory or persisted to storage media. In some embodiments, processors 910 may receive the user's telemetry data 920 including mouse movements, clicks, choices, timestamps, and other suitable telemetry data. In some embodiments, processors 910 may receive and/or generate one or more assessment scores, using the assessment framework 930 (e.g., related program or software), for each user's telemetry data according to at least some of the described systems and methods. Processors 910 may be configured to execute at least some of the described systems and methods to generate the assessment score 940 based on the telemetry data 920 and/or the assessment framework 930.

Figure 10:
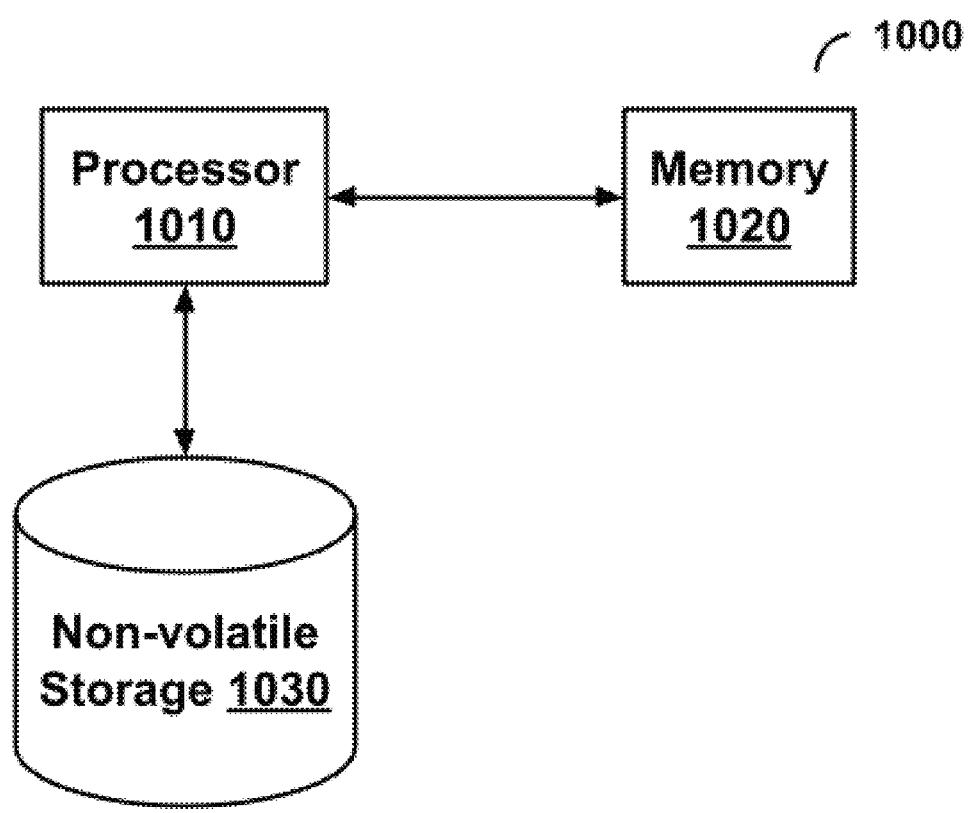
FIG. 10 is a block diagram illustrating an example computing device, in accordance with some implementations.

FIG. 10 is a block diagram illustrating an example computing device, in accordance with some implementations.

In some aspects, an illustrative implementation of a computing device 1000 that may be used in connection with any of the embodiments of the disclosure provided herein is shown in FIG. 10. In particular, FIG. 10 shows an example computer system for executing a simulation-based assessment in accordance with some embodiments of the technology described herein. The computing device 1000 may include one or more processors 1010 and one or more articles of manufacture that comprise non-transitory computer-readable storage media (e.g., memory 1020 and one or more non-volatile storage media 1030). The processor 1010 may control writing data to and reading data from the memory 1020 and the non-volatile storage device 1030 in any suitable manner. To perform any of the functionality described herein, the processor 1010 may execute one or more processor-executable instructions stored in one or more non-transitory computer-readable storage media (e.g., the memory 1030), which may serve as non-transitory computer-readable storage media storing processor-executable instructions for execution by the processor 1010.

In some embodiments, at least some of the described systems and methods are implemented in a cloud-based architecture. The cloud-based architecture may offer on-demand access to a shared pool of configurable computing resources (e.g. processors, graphics processors, memory, disk storage, network bandwidth, and other suitable resources). A processor in the cloud-based architecture may be operable to receive or obtain the user's telemetry data, including mouse movements, clicks, choices, timestamps, and other suitable telemetry data, and compute an assessment score for the user. A memory in the cloud-based architecture may store the user's telemetry data as well as the assessment framework (e.g., related program or software) which may be operated by the processor to compute the assessment score. In some embodiments, the cloud-based architecture may provide a graphics processor for computing the assessment score in a faster and more efficient manner compared to a conventional processor.

Figure 11:
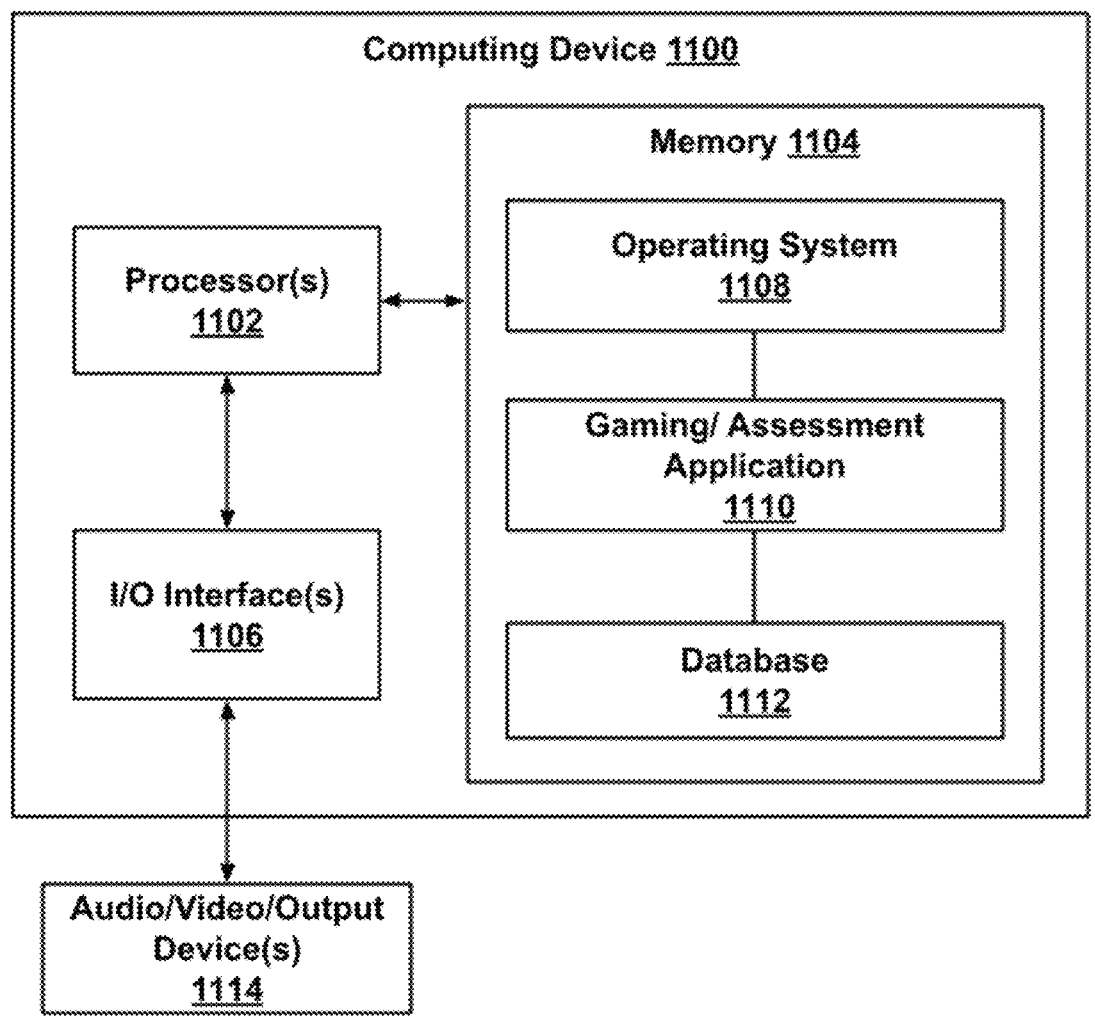
FIG. 11 is a block diagram illustrating an example computing device, in accordance with some implementations.

FIG. 11 is a block diagram of an example computing device 1100 which may be used to implement one or more features described herein. In one example, device 1100 may be used to implement a computer device (e.g. 202 and/or 210 of FIG. 2), and perform appropriate method implementations described herein. Computing device 1100 can be any suitable computer system, server, or other electronic or hardware device. For example, the computing device 1100 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1100 includes a processor 1102, a memory 1104, input/output (I/O) interface 1106, and audio/video input/output devices 1114.

Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108, one or more applications 1110, e.g., an audio spatialization application and application data 1112. In some implementations, application 1110 can include instructions that enable processor 1102 to perform the functions (or control the functions of) described herein, e.g., some or all of the methods described with respect to FIGS. 3-4, and FIGS. 5A and 5B.

For example, applications 1110 can include an audio spatialization module 1112, which as described herein can provide audio spatialization within an online gaming server (e.g., 102). Elements of software in memory 1104 can alternatively be stored on any other suitable storage location or computer-readable medium. In addition, memory 1104 (and/or other connected storage device(s)) can store instructions and data used in the features described herein. Memory 1104 and any other type of storage (magnetic disk, optical disk, magnetic tape, or other tangible media) can be considered "storage" or "storage devices."

I/O interface 1106 can provide functions to enable interfacing the server device 1100 with other systems and devices. For example, network communication devices, storage devices (e.g., memory and/or data store 120), and input/output devices can communicate via interface 1106. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1114 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 11 shows one block for each of processor 1102, memory 1104, I/O interface 1106, and software blocks of operating system 1108 and gaming application 1110. These blocks may represent one or more processors or processing circuitries, operating systems, memories, I/O interfaces, applications, and/or software engines. In other implementations, device 1100 may not have all of the components shown and/or may have other elements including other types of elements instead of, or in addition to, those shown herein. While the online gaming server 202 is described as performing operations as described in some implementations herein, any suitable component or combination of components of online gaming server 202 or similar system, or any suitable processor or processors associated with such a system, may perform the operations described.

A user device can also implement and/or be used with features described herein. Example user devices can be computer devices including some similar components as the device 1100, e.g., processor(s) 1102, memory 1104, and I/O interface 1106. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1114, for example, can be connected to (or included in) the device 1100 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 300 and 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to generate a 3D mesh for an object using a trained machine learning model, the method comprising:
   providing a two-dimensional (2D) image of the object as input to the trained machine learning model, wherein the object is associated with a particular category;
   determining the particular category of the object based on the 2D image, wherein determining the particular category of the object based on the 2D image comprises:
      determining particular portions of the object by performing semantic segmentation of the 2D image based on a set of predetermined descriptors, wherein a number of output classes for the semantic segmentation matches a number of predetermined descriptors in the set; and
      determining the particular category of the object based on the determined particular portions of the object;
   obtaining a template three-dimensional (3D) mesh associated with the particular category;
   generating, using the trained machine learning model and based on the 2D image and the template 3D mesh, a 3D mesh for the object, wherein the 3D mesh for the object is generated by deforming the template 3D mesh by the trained machine learning model, and wherein the 3D mesh for the object is usable to map a texture to the object or to generate a 3D animation of the object; and
   processing, using a bidimensional (UV) regressor, the 2D image and the 3D mesh of the object to generate a mapping from vertices of the 3D mesh of the object to the 2D image, wherein the mapping is used to apply the texture to the 3D mesh of the object, and wherein processing the 2D image and the 3D mesh of the object to generate the mapping comprises:
      determining a descriptor loss for each side of the 3D mesh of the object;
      determining a particular side of the 3D mesh of the object that is associated with the smallest descriptor loss of the determined descriptor losses; and
      utilizing the particular side of the 3D mesh of the object that is associated with the smallest descriptor loss as a basis for a UV map for the 3D mesh of the object.

2. The computer-implemented method of claim 1, further comprising displaying a user interface that includes the 3D mesh for the object.

3. The computer-implemented method of claim 1, further comprising, prior to obtaining the template 3D mesh, determining the particular category of the object based on the 2D image using image matching.

4. The computer-implemented method of claim 1, further comprising mapping the texture to the 3D mesh.

5. The computer-implemented method of claim 1, wherein the template 3D mesh is a rig comprising a plurality of vertices of the 3D mesh, and wherein each vertex of the plurality of vertices is connected to at least one other vertex of the plurality of vertices, and further comprising:
- obtaining one or more template animations associated with the template 3D mesh, wherein each template animation defines movement of two or more of the plurality of vertices; and
- generating at least one object animation for the object based on the 3D mesh and particular template animation of the one or more template animations associated with the template 3D mesh, wherein the at least one object animation includes movement of the same two or more vertices as the particular template animation of the one or more template animations.

6. The computer-implemented method of claim 1, wherein the machine learning model includes a mesh encoder, an image encoder, and a plurality of mesh decoders, and further comprising:
- receiving a plurality of target meshes; and
- training the plurality of mesh decoders, wherein each mesh decoder corresponds to a particular template mesh, wherein the training comprises:
  - encoding, using the mesh encoder, a target mesh into a shape space vector;
  - decoding, using the mesh decoder and based on the particular template mesh, the shape space vector into a deformed mesh;
  - determining a first value for a first error function based on a comparison of the target mesh and the deformed mesh; and
  - updating one or more parameters of the mesh decoder based on the first value.

7. The computer-implemented method of claim 1, wherein the machine learning model includes a mesh encoder, an image encoder, and a plurality of mesh decoders, and further comprising training the image encoder, wherein the training comprises:
- receiving a plurality of two-dimensional (2D) training images and corresponding target meshes, wherein each image depicts a particular object of a respective category and wherein the respective category is associated with a corresponding template mesh;
- generating, using the image encoder, a respective shape space vector for each of the plurality of 2D training images;
- comparing each generated shape space vector with a corresponding shape space vector for the corresponding target mesh, wherein the corresponding shape space vector associated with the target mesh is encoded using the mesh encoder;
- determining a second value for a second error function based on a comparison of the generated shape space vector and the corresponding shape space vector; and
- updating one or more parameters of the image encoder based on the second value.

8. The method of claim 1, wherein the UV regressor is trained using a loss function that includes a descriptor loss based on a Chamfer distance.

9. The computer-implemented method of claim 1, wherein the template 3D mesh is a homeomorphic template mesh.

10. The computer-implemented method of claim 1, wherein deforming the template 3D mesh by the trained machine learning model comprises applying a homeomorphic transformation such that topological properties of the template 3D mesh are preserved after the deforming.

11. A system, comprising:
a memory with instructions stored thereon; and
a processing device, coupled to the memory, the processing device configured to access the memory, wherein the instructions when executed by the processing device, cause the processing device to perform operations including:
providing a two-dimensional (2D) image of an object as input to a trained machine learning model;
determining a particular category of the object based on the 2D image, wherein determining the particular category of the object based on the 2D image comprises:
- determining particular portions of the object by performing semantic segmentation of the 2D image based on a set of predetermined descriptors, wherein a number of output classes for the semantic segmentation matches a number of predetermined descriptors in the set; and
- determining the particular category of the object based on the determined particular portions of the object;

obtaining a template three-dimensional (3D) mesh associated with the particular category;
generating, using the trained machine learning model and based on the 2D image and the template 3D mesh, a 3D mesh for the object, wherein the 3D mesh for the object is generated by deforming the template 3D mesh by the trained machine learning model, and wherein the 3D mesh for the object is usable to map a texture or to generate a 3D animation of the object; and
processing, using a bidimensional (UV) regressor, the 2D image and the 3D mesh of the object to generate a mapping from vertices of the 3D mesh of the object to the 2D image, wherein the mapping is used to apply the texture to the 3D mesh of the object, and wherein processing the 2D image and the 3D mesh of the object to generate the mapping comprises:
- determining a descriptor loss for each side of the 3D mesh of the object;
- determining a particular side of the 3D mesh of the object that is associated with the smallest descriptor loss of the determined descriptor losses; and
- utilizing the particular side of the 3D mesh of the object that is associated with the smallest descriptor loss as a basis for a UV map for the 3D mesh of the object.

12. The system of claim 11, wherein the template 3D mesh is a rig comprising a plurality of vertices of the 3D mesh, and wherein each vertex of the plurality of vertices is connected to at least one other vertex of the plurality of vertices, and wherein the operations further comprise:
- obtaining one or more template animations associated with the template 3D mesh, wherein each template animation defines movement of two or more of the plurality of vertices; and
- generating at least one object animation for the object based on the 3D mesh and particular template animation of the one or more template animations associated with the template 3D mesh, wherein the at least one object animation includes movement of the same two or more vertices as the particular template animation of the one or more template animations.

13. The system of claim 11, wherein the template 3D mesh is a homeomorphic template mesh.

14. The system of claim 11, wherein the machine learning model includes a mesh encoder, an image encoder, and a plurality of mesh decoders, and wherein the operations further comprise:

receiving a plurality of target meshes;
training the plurality of mesh decoders, wherein each mesh decoder corresponds to a particular template mesh, wherein the training comprises:
   encoding, using the mesh encoder, a target mesh into a first shape space vector;
   decoding, using the mesh decoder and based on the particular template mesh, the first shape space vector into a deformed mesh;
   determining a first value for a first error function based on a comparison of the target mesh and the deformed mesh; and
   updating one or more parameters of the mesh decoder based on the first value; and
training the image encoder, wherein the training comprises:
   receiving a plurality of two-dimensional (2D) training images and corresponding target meshes, wherein each image depicts a particular object of a respective category and wherein the respective category is associated with a corresponding template mesh;
   generating, using the image encoder, a respective shape space vector for each of the plurality of 2D training images;
   comparing each generated shape space vector with a corresponding shape space vector for the corresponding target mesh, wherein the corresponding shape space vector associated with the target mesh is encoded using the mesh encoder;
   determining a second value for a second error function based on a comparison of the generated shape space vector and the corresponding shape space vector; and
   updating one or more parameters of the image encoder based on the second value.

15. A non-transitory computer-readable medium comprising instructions that, responsive to execution by a processing device, cause the processing device to perform operations comprising:
   providing a two-dimensional (2D) image of an object as input to a trained machine learning model, wherein the object is associated with a particular category;
   determining the particular category of the object based on the 2D image, wherein determining the particular category of the object based on the 2D image comprises:
      determining particular portions of the object by performing semantic segmentation of the 2D image based on a set of predetermined descriptors, wherein a number of output classes for the semantic segmentation matches a number of predetermined descriptors in the set; and
      determining the particular category of the object based on the determined particular portions of the object;
   obtaining a template three-dimensional (3D) mesh associated with the particular category;
   generating, using the trained machine learning model and based on the 2D image and the template 3D mesh, a 3D mesh for the object, wherein the 3D mesh for the object is generated by deforming the template 3D mesh by the trained machine learning model, and wherein the 3D mesh for the object is usable to map a texture to the object or to generate a 3D animation of the object; and
   processing, using a bidimensional (UV) regressor, the 2D image and the 3D mesh of the object to generate a mapping from vertices of the 3D mesh of the object to the 2D image, wherein the mapping is used to apply the texture to the 3D mesh of the object, and wherein processing the 2D image and the 3D mesh of the object to generate the mapping comprises:
      determining a descriptor loss for each side of the 3D mesh of the object;
      determining a particular side of the 3D mesh of the object that is associated with the smallest descriptor loss of the determined descriptor losses; and
      utilizing the particular side of the 3D mesh of the object that is associated with the smallest descriptor loss as a basis for a UV map for the 3D mesh of the object.

16. The non-transitory computer-readable medium of claim 15, wherein the template 3D mesh is a homeomorphic template mesh.

17. The non-transitory computer-readable medium of claim 15, wherein the template 3D mesh is a rig comprising a plurality of vertices of the 3D mesh, and wherein each vertex of the plurality of vertices is connected to at least one other vertex of the plurality of vertices, and the operations further comprise:
   obtaining one or more template animations associated with the template 3D mesh, wherein each template animation defines movement of two or more of the plurality of vertices; and
   generating at least one object animation for the object based on the 3D mesh and particular template animation of the one or more template animations associated with the template 3D mesh, wherein the at least one object animation includes movement of the same two or more vertices as the particular template animation of the one or more template animations.

* * * * *